United States Patent
Wang et al.

(10) Patent No.: US 10,796,588 B2
(45) Date of Patent: Oct. 6, 2020

(54) SYSTEMS AND METHODS FOR COLLECTING WEATHER INFORMATION FOR SELECTED AIRSPACE REGIONS

(71) Applicant: Honeywell International Inc., Morris Plains, NJ (US)

(72) Inventors: Haiming Wang, Beijing (CN); Leo Wang, Beijing (CN); Yi Zhong, Shanghai (CN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 16/119,331

(22) Filed: Aug. 31, 2018

(65) Prior Publication Data

US 2019/0019421 A1    Jan. 17, 2019

Related U.S. Application Data (63) Continuation of application No. 14/865,039, filed on Sep. 25, 2015, now Pat. No. 10,102,759.

(51) Int. Cl.
*G08G 5/00* (2006.01)
*G01S 7/00* (2006.01)
(Continued)

(52) U.S. Cl.
CPC .......... *G08G 5/0091* (2013.01); *G01S 5/0027* (2013.01); *G01S 5/0284* (2013.01);
(Continued)

(58) Field of Classification Search
CPC .................. G08G 5/00–0026; G08G 5/0091
(Continued)

(56) References Cited

U.S. PATENT DOCUMENTS 5,459,469 A    10/1995 Schuchman
6,043,756 A    3/2000 Bateman et al.
(Continued)

FOREIGN PATENT DOCUMENTS

| EP | 3067710 | 9/2016 |
|---|---|---|
| JP | 200827011 | 2/2008 |
| JP | 2012089088 | 5/2012 |

OTHER PUBLICATIONS

European Patent Office, "Extended Search Report from EP Application No. 16190018.8 dated Jan. 26, 2017", "from Foreign Counterpart of U.S. Appl. No. 14/865,037", filed Jan. 26, 2017, pp. 1-12, Published in EP.

(Continued)

*Primary Examiner* — Jinsong Hu
*Assistant Examiner* — Rui M Hu
(74) *Attorney, Agent, or Firm* — Bookoff McAndrews, PLLC (57) ABSTRACT

Systems and methods for collecting weather information for selected airspace regions are provided. In one embodiment, a method for collecting weather information for selected airspace regions comprises: receiving aircraft position information for a plurality of aircraft; forming an aircraft weather group based on flight path attributes derived from the aircraft position information; selecting at least a first representative aircraft from the weather group; and receiving at a weather information ground station, weather data from one or more representative aircraft of the aircraft weather group, wherein only the one or more representative aircraft transmit weather information to the weather information ground station from the aircraft weather group.

17 Claims, 6 Drawing Sheets

(51) Int. Cl.

| | |
|---|---|
| *G01W 1/00* | (2006.01) |
| *G01S 13/87* | (2006.01) |
| *G01S 13/95* | (2006.01) |
| *G01W 1/02* | (2006.01) |
| *G01S 5/00* | (2006.01) |
| *G01S 5/02* | (2010.01) |
| *G01S 19/03* | (2010.01) |

(52) U.S. Cl.
CPC .............. *G01S 7/003* (2013.01); *G01S 13/87* (2013.01); *G01S 13/953* (2013.01); *G01S 19/03* (2013.01); *G01W 1/00* (2013.01); *G01W 1/02* (2013.01); *Y02A 90/18* (2018.01)

(58) Field of Classification Search
USPC ........................................ 455/431, 98, 414.3
See application file for complete search history.

(56) References Cited

U.S. PATENT DOCUMENTS

| | | | |
|---|---|---|---|
| 6,181,260 B1 | 1/2001 | Simon et al. | |
| 6,501,392 B2* | 12/2002 | Gremmert | G01S 7/003 340/971 |
| 7,069,147 B2 | 6/2006 | Manfred et al. | |
| 7,471,995 B1 | 12/2008 | Robinson | |
| 7,633,428 B1 | 12/2009 | McCusker et al. | |
| 8,121,593 B2 | 2/2012 | Pandit et al. | |
| 8,314,730 B1* | 11/2012 | Musiak | G01S 7/003 342/25 B |
| 8,344,933 B1 | 1/2013 | Kronfeld et al. | |
| 8,604,963 B1* | 12/2013 | Kronfeld | G01S 13/95 342/26 B |
| 8,626,428 B2* | 1/2014 | Ramaiah | G08G 5/0004 701/120 |
| 8,811,265 B2 | 8/2014 | Horvath | |
| 8,965,699 B2* | 2/2015 | McDonald | G01W 1/00 702/3 |
| 9,467,364 B2* | 10/2016 | Breshears | H04L 45/44 |
| 10,102,759 B2* | 10/2018 | Wang | G01S 5/0027 |
| 2002/0039072 A1* | 4/2002 | Gremmert | G08G 5/0039 340/945 |
| 2002/0075179 A1 | 6/2002 | Hudson | |
| 2004/0183695 A1* | 9/2004 | Ruokangas | G08G 5/0013 340/945 |
| 2005/0278120 A1 | 12/2005 | Manfred et al. | |
| 2006/0251100 A1 | 11/2006 | Kim et al. | |
| 2009/0012663 A1* | 1/2009 | Mead | G01W 1/10 701/14 |
| 2009/0209196 A1 | 8/2009 | Haverty | |
| 2009/0219197 A1* | 9/2009 | Bunch | G01S 13/95 342/26 B |
| 2010/0042275 A1* | 2/2010 | Kirk | G01W 1/04 701/14 |
| 2010/0045452 A1* | 2/2010 | Periwal | B60Q 9/00 340/439 |
| 2010/0223332 A1* | 9/2010 | Maxemchuk | H04W 4/08 709/204 |
| 2010/0245164 A1* | 9/2010 | Kauffman | G01S 7/2927 342/26 B |
| 2010/0332056 A1* | 12/2010 | Kirk | G01W 1/04 701/14 |
| 2011/0054718 A1* | 3/2011 | Bailey | G08G 5/0021 701/3 |
| 2011/0057830 A1 | 3/2011 | Sampigethaya et al. | |
| 2011/0183602 A1 | 7/2011 | Tietz | |
| 2011/0187588 A1* | 8/2011 | Khatwa | G08G 5/0021 342/26 B |
| 2012/0158820 A1* | 6/2012 | Bai | G07C 5/008 709/202 |
| 2012/0259549 A1* | 10/2012 | McDonald | G01W 1/00 702/3 |
| 2012/0274484 A1* | 11/2012 | Zimmer | G08G 5/0013 340/945 |
| 2013/0006450 A1* | 1/2013 | Del Amo Blanco | G08G 5/0039 701/14 |
| 2013/0033387 A1 | 2/2013 | Trope | |
| 2013/0242864 A1* | 9/2013 | Vermande | H04B 7/18506 370/328 |
| 2013/0273839 A1* | 10/2013 | Breshears | H04L 45/44 455/11.1 |
| 2014/0269474 A1 | 9/2014 | Zhu et al. | |
| 2014/0348060 A1 | 11/2014 | Li et al. | |
| 2014/0372038 A1 | 12/2014 | LeBlanc | |
| 2015/0111563 A1* | 4/2015 | Zhao | H04W 8/22 455/418 |
| 2015/0310747 A1* | 10/2015 | Frolik | G01S 7/20 340/971 |
| 2016/0266249 A1* | 9/2016 | Kauffman | G01S 13/87 |
| 2016/0285541 A1* | 9/2016 | Liu | H04B 10/1123 |
| 2017/0094590 A1 | 3/2017 | Wang et al. | |
| 2017/0214743 A1 | 7/2017 | Goldstein | |
| 2018/0005527 A1* | 1/2018 | Bostick | G08G 1/0141 |

OTHER PUBLICATIONS

Airbus, "Flight Operations Briefing Notes", "Adverse WEather Operations Optimm Use of hte Weather Radar", Feb. 2007, pp. 1-17, Publisher: Airbus.

Phak, "Chapter 12 Aviaion Weather Services", "Pilot's Handobok of Aeronautical Knowledge", Oct. 3, 2014, pp. 1-26, Publisher: Federal Aviation Administration.

Werth, "Airborne Weather Radar Limitations", "The Front", Dec. 2014, pp. 1-4, Publisher: National Weather Service.

Wang et al., "Systems and Methods for Regulating Weather Information Collection", "U.S. Appl. No. 14/865,037, filed Sep. 25, 2015", pp. 1-32, Published in: US.

European Patent Office, "Extended Search Report from EP Application No. 16190013.9 dated Feb. 24, 17", "from Foreign Counterpart of U.S. Appl. No. 14/865,039", dated Feb. 24, 2017, pp. 1-7, Published in EP.

European Patent Office, "Extended Search Report from EP Application No. 17151098.5 dated Jun. 7, 2017", "from Foreign Counterpart of U.S. Appl. No. 15/008,207", dated Jun. 7, 2017, pp. 1-7, Published in EP.

\* cited by examiner

SYSTEMS AND METHODS FOR COLLECTING WEATHER INFORMATION FOR SELECTED AIRSPACE REGIONS

CROSS-REFERENCE TO RELATED APPLICATIONS

This application is a continuation of and claims the benefit of priority to U.S. patent application Ser. No. 14/865,039, filed on Sep. 25, 2015, entitled "SYSTEMS AND METHODS FOR REGULATING WEATHER INFORMATION COLLECTION", which is incorporated herein by reference in its entirety.

BACKGROUND

For pilots of commercial and other aircraft, knowledge of weather data, in particular knowledge regarding hazardous weather along their planned route, is critical for safe operation of an aircraft. Presently, weather radar equipped onboard the aircraft is utilized to gather weather data for the flight path ahead. Further, in recent years, a connected radar concept has been proposed as the evolution of current weather radar system. Under the connected radar concept, weather information from various aircraft may be uploaded and downloaded and thus widely shared, increasing the amount and diversity of weather data available to the pilot. Such a system also benefits from the fact that weather information sensed by aircraft weather radar is typically more accurate than ground sensed weather data. One problem with the connected radar concept, however, is the potential additional heavy burden placed on air-ground communication datalinks. Commercial aircraft operations, in particular, are experiencing evolving and increasing utilization of air-ground communication datalinks for air traffic control, airline operations specific applications, and in-flight data services for passengers. Introduction of air-ground uploads and downloads of detailed weather information will only add to the burden of the wireless networks utilized by aircraft.

For the reasons stated above and for other reasons stated below which will become apparent to those skilled in the art upon reading and understanding the specification, there is a need in the art for alternate systems and methods collecting weather information for selected airspace regions.

SUMMARY

The Embodiments of the present invention provide methods and systems for collecting weather information for selected airspace regions and will be understood by reading and studying the following specification.

In one embodiment, a method for collecting weather information for selected airspace regions comprises: receiving aircraft position information for a plurality of aircraft; forming an aircraft weather group based on flight path attributes derived from the aircraft position information; selecting at least a first representative aircraft from the weather group; and receiving at a weather information ground station, weather data from one or more representative aircraft of the aircraft weather group, wherein only the one or more representative aircraft transmit weather information to the weather information ground station from the aircraft weather group.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods for collecting weather information for selected airspace regions from aircraft flying in or near the selected region. More specifically, embodiments of the present disclosure categorize aircraft into different aircraft weather groups based on aircraft having similar flight path attributes. That is, the aircraft making up each group are similarly situated such that their on-board weather sensors should be observing and/or experiencing similar weather conditions. In addition to aircraft position, flight path attributes used to define an aircraft weather group may include one or more of flying direction, inter-distance between aircraft, on-board radar detection directions, and aircraft altitude, for example. As such, if a weather station needs to obtain weather information for a specific region of airspace that is an area-of-interest, it may define one or more aircraft weather groups comprising aircraft flying in or near that area-of-interest. For example, in one instance, an aircraft weather group may be defined simply from aircraft that either occupy the area-of-interest or are travelling towards the area-of-interest. In another instance, a first aircraft weather group may be defined for aircraft traveling a first direction towards or through the area-of-interest while a second aircraft weather group may be defined for aircraft traveling a second direction towards or through the area-of-interest. Since each weather group is defined based on the likelihood that aircraft in the group are observing and/or experiencing similar weather conditions, it would be unnecessary for every member aircraft of the aircraft weather group to transmit its set of on-board generated weather data to the ground station. Therefore, with embodiments of the present disclosure, one or more representative aircraft may be selected from the aircraft weather group to send on-board generated weather data to the ground station instead of having every member of the group do so. As discussed below, nomination of the representative aircraft can be based on a random selection, or based on considering criteria such the relative position of aircraft within the group. Further, the nomination of the representative aircraft for the aircraft weather group may be dictated by the ground station, or decided by the members of each aircraft weather group. Accordingly, embodiments disclosed herein, among other things, reduce the redundant transmission of weather information and thus reduce cost and network burden.

Figure 1:
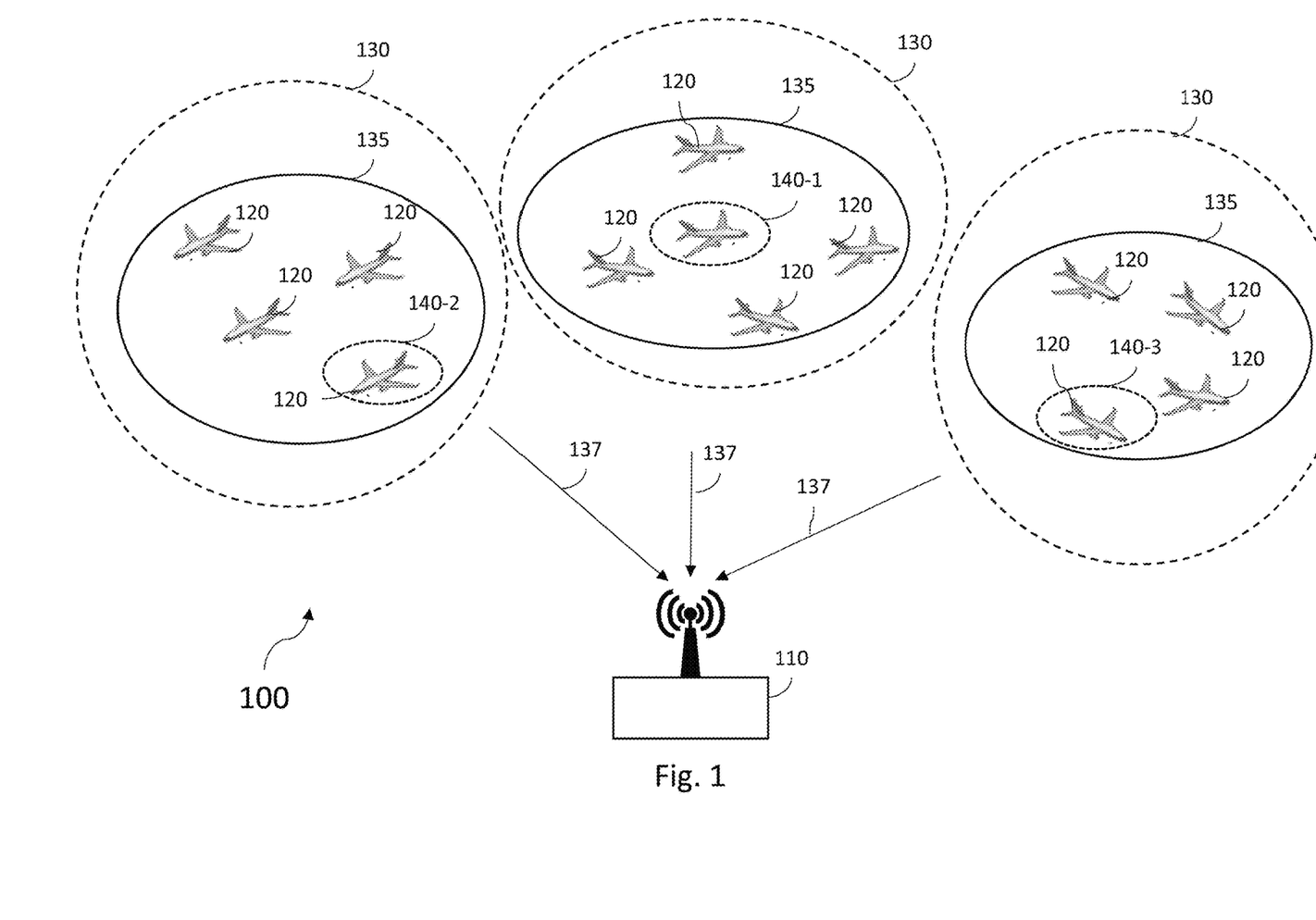
FIGS. 1, 1A and 1B are diagrams illustrating a weather information collection system 100 of one embodiment of the present disclosure.
Figure 1A:
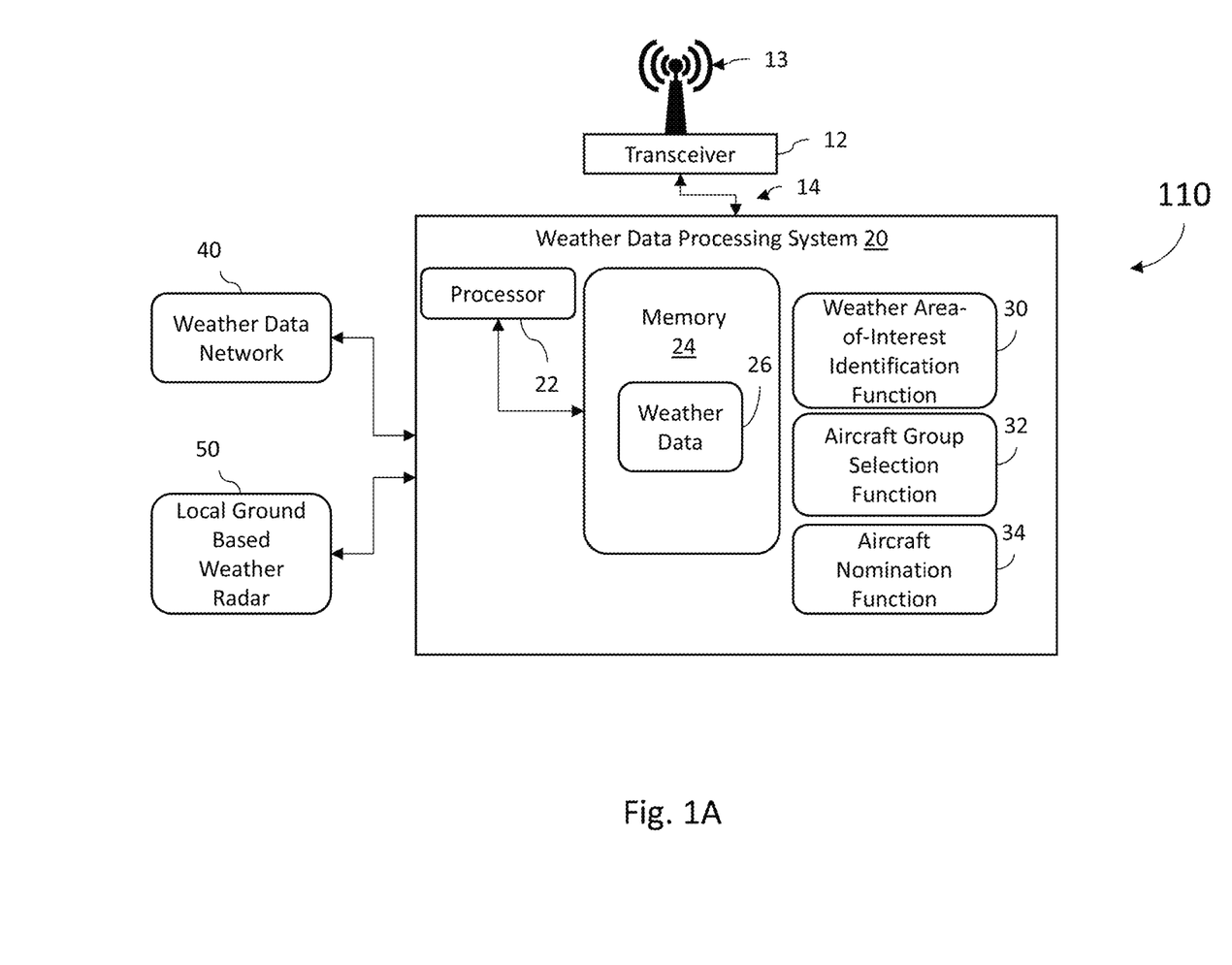
Figure 1B:
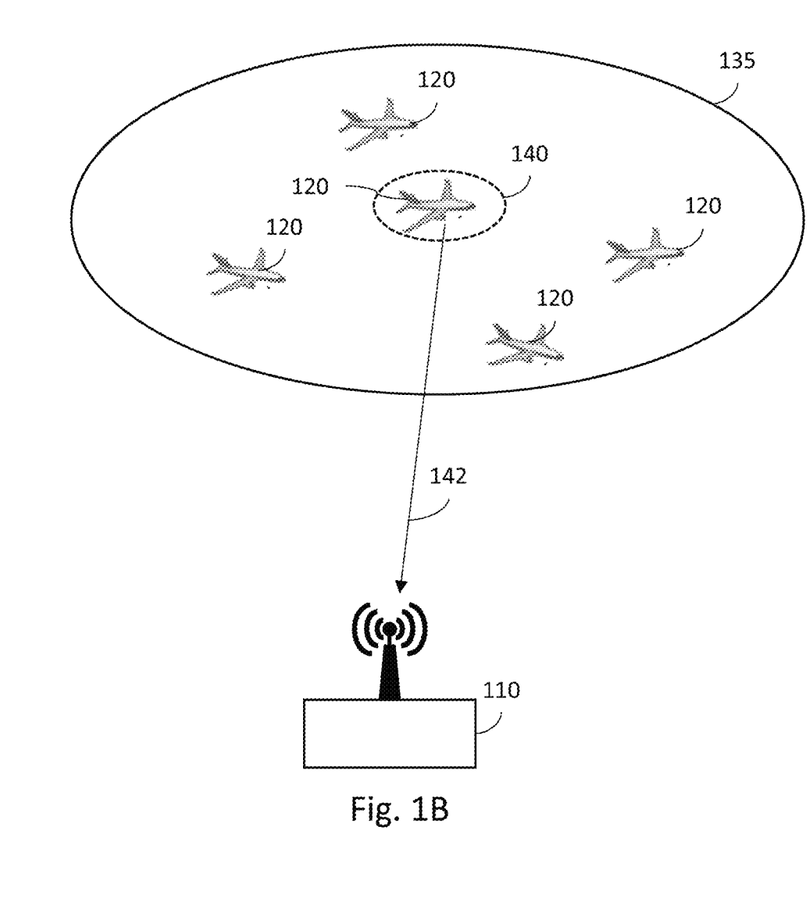

FIGS. 1, 1A and 1B are diagrams illustrating a weather information collection system 100 of one embodiment of the present disclosure. System 100 comprises a weather information ground station 110 and a plurality of aircraft 120 flying within the operating range of the ground station 110 and in communication with the ground station 110. Weather information ground station 110 may identify one or more specific weather areas of interest (i.e., some specifically bound sub-space or portion of the airspace around the ground station) for which it desires to obtain weather data generated by on-board weather sensors. These are depicted in FIG. 1 as weather areas 130. Selection of an area-of-interest within the airspace to define as a weather area 130 by weather information ground station 110 may be based on current or predicted weather activity within a region, or as part of a general weather survey of the airspace.

For each of the weather areas 130, weather information ground station 110 defines aircraft weather groups 135 which are a sub-set of the plurality of aircraft 120. The aircraft 120 making up each aircraft weather group 135 are similarly situated such that their on-board weather sensors should be observing and/or experiencing similar weather conditions associated with their weather area 130. In one embodiment, the selection of aircraft to form an aircraft weather group 135 is based on the aircraft having similar flight path attributes such as, but not limited to, flying direction, inter-aircraft distance, altitude and position.

As illustrated in FIG. 1A, in one embodiment, weather information ground station 110 comprises at least one transceiver 12 coupled to a weather data processing system 20. The at least one transceiver 12 is coupled to at least one antenna 13 and incorporates electronics and other components to establish bidirectional wireless data communication links with avionics aboard aircraft (such as aircraft 120 shown in FIG. 1). Such communication links may include, but are not limited to, received Automatic Dependent Surveillance-Broadcast (ADS-B) messages and weather data, Aircraft Communications Addressing and Reporting System (ACARS) datalinks and/or satellite communications (SATCOM). It should be appreciated that in alternate implementations, transceiver 12 and weather data processing system 20 may be located at the same physical ground facility or instead located at some remote distance from each other and connected by a communication link 14.

Weather data processing system 20 comprises at least one processor 22 coupled to a memory 24 which may be used for storing weather information 26 collected from, and shared with, aircraft 120. In the embodiment shown in FIG. 1A, weather data processing system 20 further comprises a weather area-of-interest identification function 30, an aircraft weather group selection function 32, and a representative aircraft nomination function 34. Each of these functions may be implemented as a computer executable function or module executed by processor 22.

As mentioned above, in one embodiment, selection of an area-of-interest within the airspace to define as a weather area 130 by weather information ground station 110 may be based on current or predicted weather activity within a region. For example, in one embodiment, weather information ground station 110 is equipped with or otherwise coupled to ground based weather sensors 50 (such as a ground based weather radar, for example). When the ground based weather sensors 50 detect weather activity in a certain region, the weather area-of-interest identification function 30 can define a weather area 130 about that region to obtain more detailed information from an airborne aircraft. In other embodiment, weather information ground station 110 is coupled to a weather data network 40 from which an incoming request for airborne weather information may be received for a certain region. The weather area-of-interest identification function 30 may then define a weather area 130 about that region to obtain the requested data. In some implementations, the weather area 130 may instead be specified by the incoming request itself from the weather data network 40.

Once a weather area 130 is defined, weather information ground station 110 determines which aircraft 120 are used to comprise aircraft weather group 135 to monitor that area. In one embodiment in operation, weather information ground station 110 receives and uses position information, such as ADS-B messages (shown at 137) transmitted from aircraft 120 as input information to weather data processing system 20 to form the specific aircraft weather groups 135. Weather area-of-interest identification function 30 defines a weather area 130 based on a need to obtain detailed weather information regarding conditions in that region of airspace. ADS-B messages are periodically broadcast by aircraft 120 and contain position information that enable each aircraft 120 it to be tracked. By using the received ADS-B messages, aircraft weather group selection function 32 may track flight path attributes such as, for example, the exact position of each aircraft, the inter-aircraft distance between aircraft, and/or the altitude of each aircraft, and thus know which aircraft are in the vicinity of the specific weather area 130 and which aircraft to group together. By identifying aircraft with similar flight path attributes, aircraft weather group selection function 32 groups a selection of aircraft 120 to form an aircraft weather group 135. In one implementation, inter-aircraft distances are calculated by aircraft weather group selection function 32 from position information received via ADS-B messages. The data from the received ADS-B messages may be cross correlated to first identify those aircraft having similar flight path attributes, and from those attributes identify which aircraft 120 are best situated to monitor a specific weather area 130 to define an aircraft weather group 135. For example, in one embodiment, an aircraft weather group 135 is assembled by aircraft weather group selection function 32 at least in part based on an inter-aircraft distance criteria aircraft (i.e., by identifying aircraft that are within a threshold distance from each other). In one implementation, when the distance between two aircraft is within a threshold (say 100 miles, for example) then the weather observed by the two aircraft may be assumed to be similar and the two aircraft may be assigned membership within the same aircraft weather group 135. Similarly, on-board weather radar detection direction (which will correlate with the aircraft heading) and aircraft altitude are flight path attributes that can obtained via ADS-B messages and also used as the basis for defining and aircraft weather group 135. By detecting the ADS-B message either continuously or some repeating basis, then the fight direction of an aircraft can be predicted. From that information, radar detection direction can be predicted since radar detection direction is consistent with flight direction. This same position information and other flight path attributes may bay obtained from other sources when ADS-B messages are not available (such as when flying over a sea) and can be communicated via other communication links such as satellite communication (Satcom).

As illustrated in FIG. 1B, once an aircraft weather group 135 is defined to collect weather data for a weather area 130, at least one of the member aircraft 120 is nominated as a representative aircraft to transmit weather data 142 to the weather data processing system 20 at weather information ground station 110. In FIG. 1B, the aircraft shown at 140 is the representative aircraft for that aircraft weather group 135.

Several methods are available for selection which aircraft within an aircraft weather group 135 may serve as the representative aircraft 140. The representative aircraft nomination function 34 facilitates that selection. For example, in one embodiment, representative aircraft 140 may be selected by the representative aircraft nomination function 34. In other embodiments, representative aircraft nomination function 34 may collect and transmit member aircraft position information which can facilitate each of the aircraft of group 135 in deciding from themselves if they should be representative aircraft 140.

Figure 2:
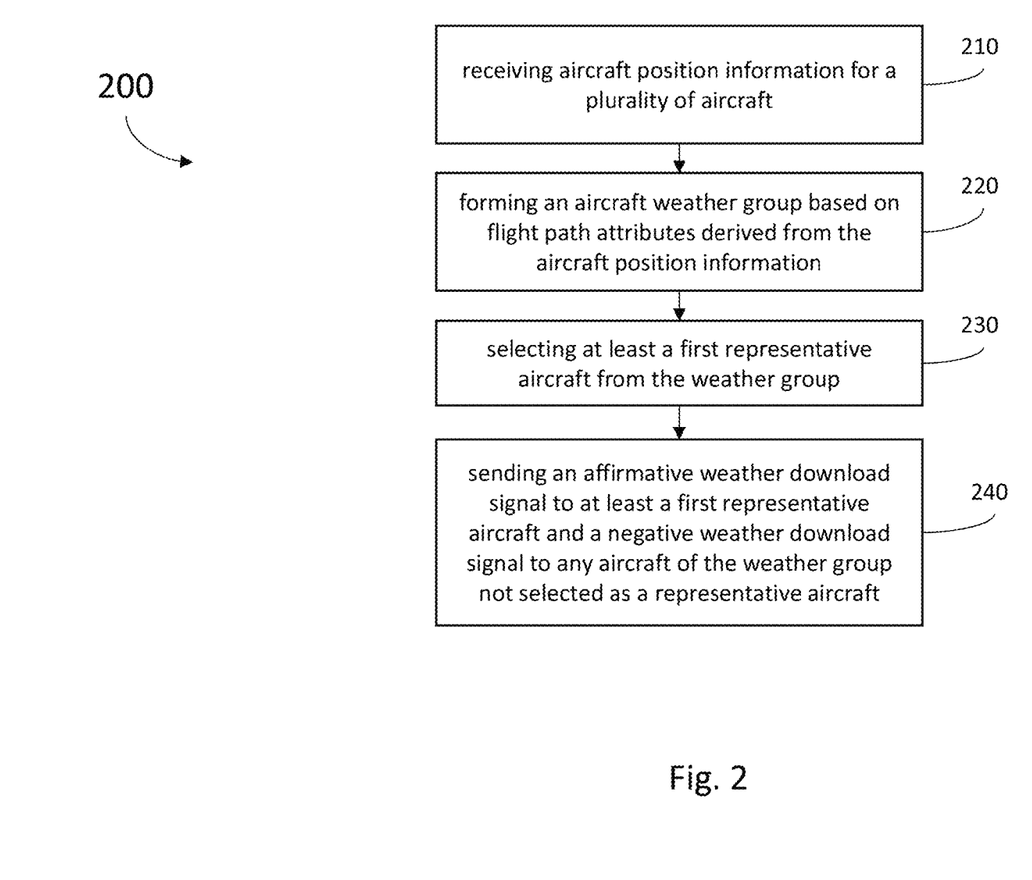
FIG. 2 is a flow chart illustrating a method of one embodiment of the present disclosure.

FIG. 2 is a flow chart illustrating an example method 200 embodiment used by system 100 wherein a representative aircraft is selected at a central controlling entity (such as the weather information ground station 110) and communicated to the aircraft 120 within a weather group 135. The method begins as 210 with receiving aircraft position information for a plurality of aircraft. The aircraft position information may be received as ADS-B messages, or alternately via other communication links and/or sources. The method proceeds to 220 with forming an aircraft weather group 135 based on flight path attributes derived from the aircraft position information. Flight path parameters may include flying direction, inter-aircraft distance, altitude and position as well as radar detection direction. Aircraft are selected based on having flight path parameters similar to each other. That is, the flight path parameters indicate that each of the selected aircraft are similarly situated such that their onboard weather sensors should be observing and/or experiencing similar weather conditions associated with a specific weather area that is an area-of-interest within the airspace. The method proceeds to 230 with selecting at least a first representative aircraft from the weather group. In one implementation, this selection may be random. That is, the representative aircraft nomination function 34 selects an aircraft at random from the weather group to be a representative aircraft 140. Given that each of the aircraft are observing and/or experiencing similar weather conditions, then downloaded weather information from any arbitrarily selected aircraft of the group should be equivalent to downloaded weather information from any other aircraft of the group 135. Alternatively, selection may be based on a non-random criteria, such as aircraft position. For example, in one implementation the representative aircraft nomination function 34 may calculate a geometric center point of the weather group from the known position of each aircraft and estimate which aircraft of the weather group is closest to that geometric center point. The aircraft of the weather group closes to the geometric center point would be selected as a representative aircraft 140 (for example, representative aircraft 140-1 shown in FIG. 1). Alternatively, the representative aircraft nomination function 34 may calculate which aircraft of the weather group is closest to the weather information ground station 110 and that closest aircraft is the representative aircraft 140 (for example, representative aircraft 140-2 or 140-3 shown in FIG. 1). Once the representative aircraft 140 are selected at 230, the method proceeds to 240 with sending an affirmative weather transfer signal to at least a first representative aircraft and a negative weather transfer signal to any aircraft of the weather group not selected as a representative aircraft. The affirmative weather transfer signal informs the representative aircraft that it has permission to transfer weather information to the weather information ground station. In some implementations, the affirmative weather transfer signal may comprise an actual weather data transmission request to begin transferring the current weather information from on-board weather sensors. Upon receiving the weather data transmission request, the representative aircraft would have permission to continue to transmit weather information until it is instruction to cease transmitting weather information. In other implementations, the affirmative weather transfer signal may convey permission to the representative aircraft to transfer current weather information at its own discretion, for example whenever its sensors have a generated new set of weather information. In contrast, the negative weather transfer signal informs the aircraft of the weather group not selected at a representative aircraft that they should not attempt to transfer any weather information to the weather information ground station.

Figure 3:
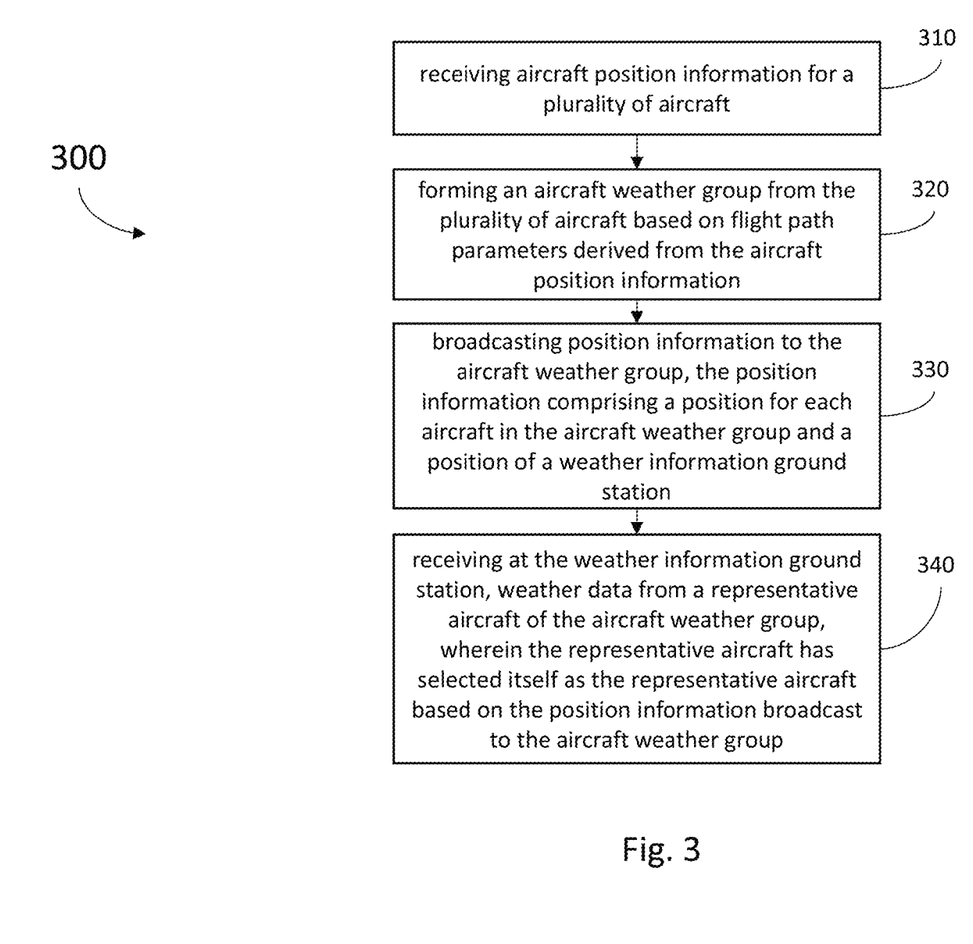
FIG. 3 is a flow chart illustrating a method of one embodiment of the present disclosure.

FIG. 3 is a flow chart illustrating another example method 300 embodiment used by system 100 wherein representative aircraft are self-selected by the aircraft within a weather group using information communicated to them by the weather information ground station 110. The method begins as 310 with receiving aircraft position information for a plurality of aircraft. The aircraft position information may be received as ADS-B messages, or alternately via other communication links and/or sources. The method proceeds to 320 with forming an aircraft weather group from the plurality of aircraft based on flight path parameters derived from the aircraft position information. Flight path parameters may include flying direction, inter-aircraft distance, altitude and position as well as radar detection direction. Aircraft are selected based on having flight path parameters similar to each other. That is, the flight path parameters indicate that each of the selected aircraft are similarly situated such that their onboard weather sensors should be observing and/or experiencing similar weather conditions associated with a specific weather area that is an area-of-interest within the airspace.

The method proceeds to 330 with broadcasting position information to the aircraft weather group, the position information comprising a position for each aircraft in the aircraft weather group and a position of a weather information ground station. Using this position information, the aircraft of the aircraft weather group each self-determine whether they are a representative aircraft for the aircraft weather group based on comparing their distance to the weather information ground station to distances of other aircraft of the aircraft weather group to the weather information ground station. The aircraft which select themselves to as representative aircraft will transmit weather data to the weather information ground station. Aircraft of the aircraft weather group that do not select themselves to be representative aircraft will refrain from transmitting its weather data to the weather information ground station. For example, in one implementation, when an aircraft determines that it is closer to the weather information ground station than any other aircraft of the aircraft weather group, then it nominates itself as a representative aircraft and will transmit its weather data to the weather information ground station. When an aircraft determines that it is not closer to the weather information ground station than any other aircraft of the aircraft weather group, then it will refrain from transmitting its weather data to the weather information ground station.

Accordingly the method proceeds to 340 with receiving at the weather information ground station, weather data from a representative aircraft of the aircraft weather group, wherein the representative aircraft has selected itself as the representative aircraft based on the position information broadcast to the aircraft weather group.

Figure 4:
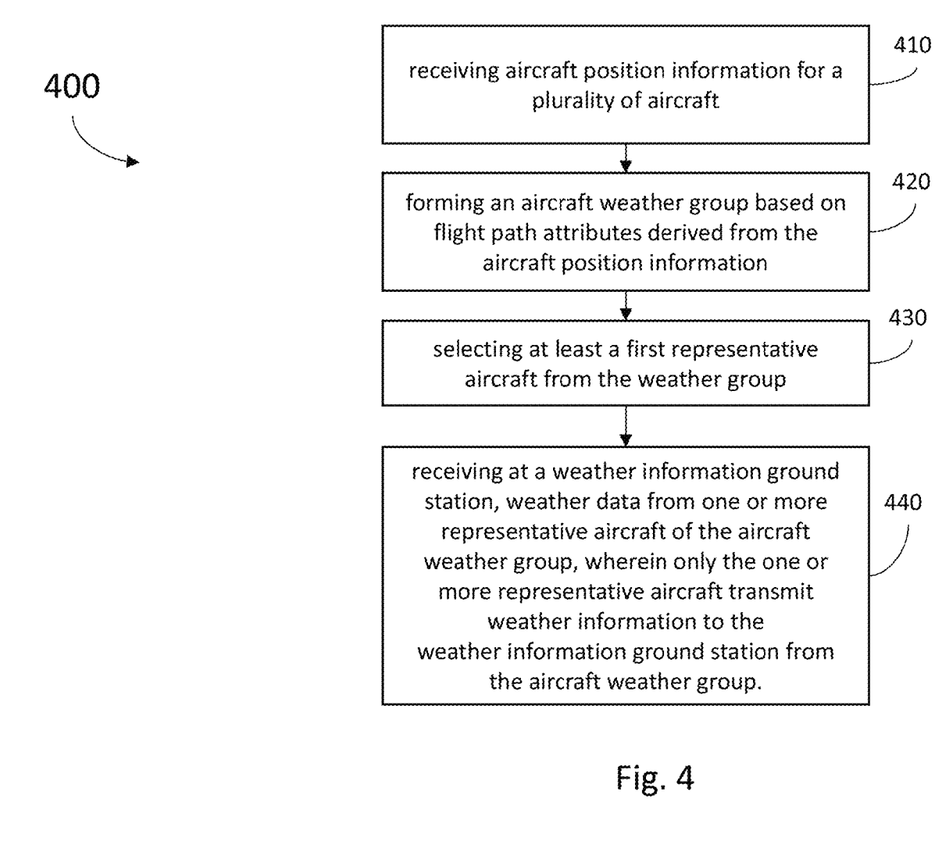
FIG. 4 is a flow chart illustrating a method of one embodiment of the present disclosure.

FIG. 4 is a flow chart illustrating another example method 400 embodiment used by system 100 more broadly describing the embodiments of methods 200 and 300. Method 400 begins at 410 with receiving aircraft position information for a plurality of aircraft and proceeds to 420 with forming an aircraft weather group based on flight path attributes derived from the aircraft position information, as previously discussed above. At 430, the method proceeds with selecting at least a first representative aircraft from the weather group. Here, this may be done by transmitting affirmative weather transfer signals to the selected representative aircraft and a negative weather transfer signal to any aircraft of the weather group not selected as a representative aircraft (as per the method discussed in FIG. 2) or by broadcasting position information to the aircraft weather group, the position information comprising a position for each aircraft in the aircraft weather group and a position of a weather information ground station (as per the method discussed in FIG. 3). The method 400 then proceeds to 440 with receiving at a weather information ground station, weather data from one or more representative aircraft of the aircraft weather group, wherein only the one or more representative aircraft transmit weather information to the weather information ground station from the aircraft weather group. The weather data may then be stored in memory, to be compiled with other weather data, and/or shared with other aircraft.

It should be understood that methods 200, 300 and 400 may be implemented using any one of the other embodiments described above. As such, elements of methods 200, 300 and 400 may be used in conjunction with, in combination with, or substituted for elements of the embodiments described above. Further, the functions, structures and other description of elements for such embodiments described above may apply to like named elements of methods 200, 300 and 400 and vice versa.

EXAMPLE EMBODIMENTS

Example 1 includes a method for collecting weather information for selected airspace regions, the method comprising: receiving aircraft position information for a plurality of aircraft; forming an aircraft weather group based on flight path attributes derived from the aircraft position information; selecting at least a first representative aircraft from the weather group; and receiving at a weather information ground station, weather data from one or more representative aircraft of the aircraft weather group, wherein only the one or more representative aircraft transmit weather information to the weather information ground station from the aircraft weather group.

Example 2 includes the method of example 1, wherein selecting at least a first representative aircraft from the weather group further comprises: sending an affirmative weather transfer signal to at least a first representative aircraft and a negative weather transfer signal to any aircraft of the weather group not selected as a representative aircraft.

Example 3 includes the method of example 2, wherein the affirmative weather transfer signal includes one or both of: a weather data transmission request to the representative aircraft; or an indication of permission to the representative aircraft to transfer current weather information at its own discretion.

Example 4 includes the method of any of examples 1-3, wherein selecting at least a first representative aircraft from the weather group further comprises: broadcasting position information to the aircraft weather group, the position information comprising a position for each aircraft in the aircraft weather group and a position of a weather information ground station; wherein the one or more representative aircraft has selected itself as the representative aircraft based on the position information broadcast to the aircraft weather group.

Example 5 includes the method of any of examples 1-4, wherein selecting at least a first representative aircraft from the weather group is either: based on a random selection; or based on a relative position of aircraft within the aircraft weather group.

Example 6 includes the method of any of examples 1-5, wherein receiving aircraft position information for a plurality of aircraft further comprises: receiving Automatic Dependent Surveillance-Broadcast (ADS-B) messages from each of the plurality of aircraft.

Example 7 includes the method of any of examples 1-6, wherein forming an aircraft weather group based on flight path attributes derived from the aircraft position information comprises: selecting the aircraft weather group to include aircraft from the plurality of aircraft to include aircraft flying towards or through a weather area-of-interest.

Example 8 includes the method of any of examples 1-7, wherein flight path attributes include at least one of: a direction of flight; a radar detection direction; an inter-aircraft distance; an altitude; and a position.

Example 9 includes the method of any of examples 1-8, further comprising: selecting a weather area of interest within an airspace; and wherein receiving at the weather information ground station weather data from one or more representative aircraft of the aircraft weather group further comprises receiving weather data regarding weather conditions within the weather area of interest.

Example 10 includes the method of example 9, wherein selecting the weather area of interest further comprises one or both of: selecting the weather area of interest based on current or predicted weather activity within the weather area of interest; or selecting the weather area of interest as part of a general weather survey of the airspace.

Example 11 includes the method of any of examples 9-10, wherein selecting the weather area of interest further comprises one or both of: receiving an incoming request from a weather data network for airborne weather information for the weather area of interest; or selecting the weather area of interest based on weather activity detected by ground based weather sensors.

Example 12 includes a system for collecting weather information for selected airspace regions, the system comprising: at least one transceiver configured to communicate with aircraft via one or more data communication links; a weather data processing system coupled to the at least one transceiver, the weather data processing system comprising a processor coupled to a memory that stores weather information compiled from aircraft collected weather data; wherein the weather data processing system further comprises a weather area-of-interest identification function, an aircraft weather group selection function, and a representative aircraft nomination function; wherein the aircraft weather group selection function is configured to receive, via the at least one transceiver, position information for a plurality of aircraft flying within an airspace and further configured to form an aircraft weather group from the plurality of aircraft based on a weather area-of-interest identified by the weather area-of-interest identification function and flight path attributes derived from the aircraft position information; wherein the representative aircraft nomination function is configured to facilitate selection of one or more representative aircraft from the aircraft weather group; and wherein the weather data processing system is further configured to store weather information regarding the weather area-of-interest in the memory.

Example 13 includes the system of example 12, wherein the representative aircraft nomination function selects the one or more representative aircraft based on one of: which aircraft of the aircraft weather group are closest to a center point of the aircraft weather group; or which aircraft of the aircraft weather group are closest to a weather information ground station.

Example 14 includes the system of any of examples 12-13, wherein the representative aircraft nomination function selects the or more representative aircraft; and wherein the weather data processing system sends an affirmative weather transfer signal to at least a first representative aircraft and a negative weather transfer signal to any aircraft of the weather group not selected as a representative aircraft.

Example 15 includes the system of any of examples 12-14, wherein the affirmative weather transfer signal includes one or both of: a weather data transmission request to the first representative aircraft; or an indication of permission to the first representative aircraft to transfer current weather information at its own discretion.

Example 16 includes the system of any of examples 12-15, wherein the representative aircraft nomination function facilitates selection of one or more representative aircraft from the aircraft weather group by sending position information to the aircraft weather group, the position information comprising a position for each aircraft in the aircraft weather group and a position of a weather information ground station.

Example 17 includes the system of any of examples 12-16, wherein the aircraft weather group selection function is configured to derive the flight path attributes based on Automatic Dependent Surveillance-Broadcast (ADS-B) messages received from each of the plurality of aircraft.

Example 18 includes the system of example 17, wherein flight path attributes include at least one of: a direction of flight; a radar detection direction; an inter-aircraft distance; an altitude; and a position.

Example 19 includes the system of any of examples 12-18, wherein the aircraft weather group selection function selects the aircraft weather group to include aircraft from the plurality of aircraft that are flying towards or through the weather area-of-interest.

Example 20 includes the system of any of examples 12-19, wherein the weather area-of-interest identification function selects the weather area of interest based on current or predicted weather activity within the weather area of interest.

In various alternative embodiments, system elements, method steps, or examples described throughout this disclosure (such as the weather information ground station, Weather Data Processing System, Weather Area-of-Interest Identification Function, Aircraft Group Selection Function, Aircraft Nomination Function or sub-parts thereof, for example) may be implemented using one or more computer systems, field programmable gate arrays (FPGAs), or similar devices comprising a processor coupled to a memory (such as shown in FIG. 1A, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for collecting environment information for a region, the method comprising:
   receiving position information of a plurality of vehicles in a region;
   forming a vehicle group of vehicles from among the plurality of vehicles in the region by cross correlating vehicle path attributes derived from the position information to identify vehicles of the plurality of vehicles having similar vehicle path attributes enabling vehicles of the vehicle group to monitor environmental variables in the region;
   selecting a vehicle from the vehicle group by calculating a geometric center point of the vehicle group and selecting a vehicle closest to the geometric center point of the vehicle group as the selected vehicle; and
   receiving, at a station, environment information collected from the selected vehicle, the environment information having been collected at the selected vehicle and not from remaining vehicles in the vehicle group for transmission to the station.

2. The method of claim 1, wherein the selecting the vehicle from the vehicle group further includes:
   sending an affirmative transfer signal to the selected vehicle and a negative transfer signal to the remaining vehicles in the vehicle group.

3. The method of claim 2, wherein the affirmative transfer signal includes one or both of:
   an environment information transmission request to the selected vehicle; or
   an indication of permission to the selected vehicle to transfer current environment information.

4. The method of claim 1, wherein the selecting the selected vehicle from the vehicle group further includes:
   broadcasting group position information to the vehicle group, the group position information including a position of the vehicles of the plurality of vehicles having similar vehicle path attributes and a position of the station; and wherein the selected vehicle has selected itself as the selected vehicle based on the group position information.

5. The method of claim 1, wherein the receiving position information for the plurality of vehicles further includes:

receiving Automatic Dependent Surveillance Broadcast (ADS-B) messages from the plurality of vehicles.

6. The method of claim 1, wherein the forming the vehicle group further includes:

selecting vehicles from the plurality of vehicles that are travelling towards or through an area-of-interest in the region.

7. The method of claim 1, wherein the vehicle path attributes include at least one of:

a direction of travel;
a radar detection direction;
an inter-vehicle distance; and
a position.

8. The method of claim 1, further comprising:

selecting an area of interest within the region; and
wherein the receiving, at the station, the environment information further includes receiving data regarding conditions within the area of interest.

9. The method of claim 8, wherein the selecting the area of interest further includes one or both of:

selecting the area of interest based on current or predicted activity within the area of interest; or
selecting the area of interest as part of a survey of the region.

10. The method of claim 8, wherein the selecting the area of interest further includes one or both of:

receiving an incoming request from a data network for the environment information for the area of interest; or
selecting the area of interest based on activity detected by sensors.

11. A system for collecting environment information for a region, the system comprising:

a transceiver configured to communicate with a plurality of vehicles via one or more data communication links; and a data processing system coupled to the transceiver, the data processing system comprising a memory storing instructions and a processor coupled to the memory and configured to execute the instructions to execute a process including:

receiving position information of the plurality of vehicles in a region via the one or more data communications links;

forming a vehicle group of vehicles from among the plurality of vehicles in the region by cross correlating vehicle path attributes derived from the position information to identify vehicles of the plurality of vehicles having similar vehicle path attributes enabling vehicles of the vehicle group to monitor environmental variables in the region;

selecting a vehicle from the vehicle group by calculating a geometric center point of the vehicle group and selecting a vehicle closest to the geometric center point of the vehicle group as the selected vehicle; and receiving, at a station, environment information collected from the selected vehicle via the one or more data communications links, the environment information having been collected at the selected vehicle and not from remaining vehicles in the vehicle group for transmission to the station.

12. The system of claim 11, wherein the process executed by the processor further includes:

transmitting an affirmative transfer signal to the selected vehicle and a negative transfer signal to the remaining vehicles of the vehicle group.

13. The system of claim 12, wherein the affirmative transfer signal includes one or both of:

a environment information transmission request to the selected vehicle; or
an indication of permission to the selected vehicle to transfer current environment information.

14. The system of claim 11, wherein the process executed by the processor further includes:

broadcasting group position information to the vehicle group, the group position information including a position of the vehicles of the plurality of vehicles having similar vehicle path attributes and a position of the station.

15. The system of claim 11, wherein the process executed by the processor further includes:

deriving the vehicle path attributes based on Automatic Dependent Surveillance-Broadcast (ADS-B) messages received from the plurality of vehicles.

16. The system of claim 15, wherein the vehicle path attributes include at least one of:

a direction of travel;
a radar detection direction;
an inter-vehicle distance; and
a position.

17. The system of claim 11, wherein the process executed by the processor further includes:

selecting an area of interest within the region; and
receiving, at the station, as the environment information, data regarding conditions within the area of interest.

* * * * *